United States Patent [19]

Ahn

[11] Patent Number: 4,723,177

[45] Date of Patent: Feb. 2, 1988

[54] FRONT LOADING DEVICE OF A VIDEO CASSETTE TAPE RECORDER

[75] Inventor: Ki H. Ahn, Daejon, Rep. of Korea

[73] Assignee: Park, Kim & Partner, Seoul, Rep. of Korea

[21] Appl. No.: 888,384

[22] Filed: Jul. 24, 1986

[30] Foreign Application Priority Data

Jul. 24, 1985 [KR] Rep. of Korea ............... 9413/1985

[51] Int. Cl.⁴ .................................... G11B 17/04
[52] U.S. Cl. .................................... 360/96.5; 360/93
[58] Field of Search .................. 360/93, 96.1, 96.5

[56] References Cited

U.S. PATENT DOCUMENTS 4,626,939 12/1986 Takai et al. ............... 360/96.5
4,672,478 6/1987 Takai et al. ............... 360/96.5 X Primary Examiner—John H. Wolff
Attorney, Agent, or Firm—Cushman, Darby & Cushman

[57] ABSTRACT

A front loading device of a video cassette tape recorder, and particularly to a front loading device of a video cassette tape recorder wherein a cassette tape is loaded on and ejected from reel table in the recorder by the power a loading motor.

1 Claim, 4 Drawing Figures

FRONT LOADING DEVICE OF A VIDEO CASSETTE TAPE RECORDER

BACKGROUND OF THE INVENTION

Conventional video cassette tape recorders utilize a separate elevation motor for loading and ejecting a cassette tape. The provision of such elevation motor causes the manufacturing cost to be increased. Since the motor is mounted on the side wall of the bracket of cassette housing, there are disadvantages of the complicated construction and the large size.

To eliminate the use of saparate motor, the use of existing loading motor has been proposed. In this case, a complicated power transmission construction is necessary, thereby causing the motor to be over-loaded.

SUMMARY OF THE INVENTION

Therefore, an object of the invention is to eliminate the above-mentioned disadvantages encountered in the prior art and to provide a front loading device of a video cassette tape recorder wherein a cassette tape can be loaded on and ejected from reel table in the recorder by a simple transmission construction utilizing the power of the existing loading motor.

In accordance with the present invention, this object is accomplished by providing a front loading device of a video cassette tape recorder comprising a cassette holder having a pin outwardly protruded from one side wall of said cassette holder and inserted into a guide slot formed at a housing bracket of the body of recorder, thereby enabling said cassette holder to be guided between ejecting and operating positions thereof; a gear mounted at the outside of said housing to be freely rotatable and adapted to move said cassette holder by the rotation thereof; and a loading motor fixedly mounted to the bottom of said housing bracket and adapted to provide a driving force for rotating a cam gear with a vortex cam slot in order to operate a connecting plate for changing the operating mode of the recorder, which connecting plate is operatively connected to said cam gear by means of a pin protruded from said connecting plate and guided along said vortex cam slot of cam gear, said loading motor connected to said cam gear by means of a belt-pulley device and transmission gears, said device being characterized by further comprising a mechanism for transmitting the drive force of said loading motor to said gear for moving the cassette holder during the loading and unloading operations thereof, comprising: a lever pivotably mounted at one end thereof to the bottom of said housing bracket by means of a shaft mounted at one end thereof to the bottom of said housing bracket to be freely rotatable and extended upwardly therefrom, the other end of said lever extending to the position where said connecting plate can contact with said other end of lever; a first connecting gear mounted to an extension from said one end of lever to be freely rotatable and selectively connected with said belt-pulley device depending the pivoted position of said lever, so as to receive the driving force of said loading motor; a second connecting gear fixedly mounted to said shaft functioning as the pivot axis of said lever and engaged with said first connecting gear; a worm gear fixedly mounted to the upper end of said shaft and engaged with said gear for moving the cassette holder; a spring supported at one end thereof to said lever and at the other end thereof to the bottom of said housing bracket and adapted to urge the lever in a direction that said first connecting gear engages with said belt-pulley device to receive the driving force of said loading motor; and said vortex cam slot having a radius-unchanged slot portion adapted to cause said connecting plate to push said other end of lever such that said lever pivots in a direction that said first connecting gear engages with said belt-pulley device to receive the driving force of said loading motor and adapted to maintain the engagement between said first connecting gear and said belt-pulley device during the loading and unloading operations of the front loading device.

BRIEF DESCRIPTION OF THE DRAWINGS

Other objects and advantages of the present invention will be apparent from the following description of a preferred embodiment of the invention taken in conjuction with the attached drawings, wherein.

DETAILED DESCRIPTION OF THE PREFERRED EMBODIMENTS

Figure 1:
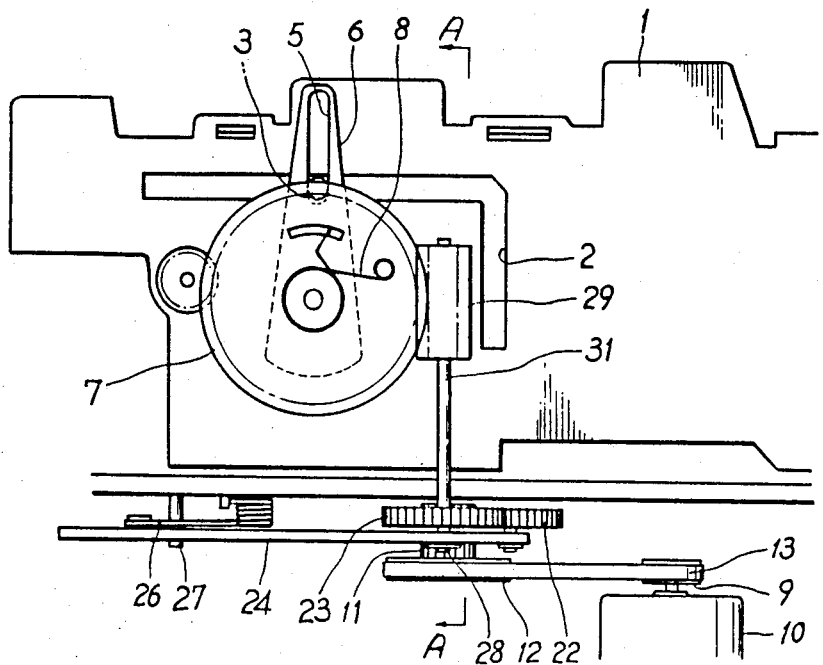
FIG. 1 is a schematic side view of a front loading device of a video cassette tape recorder in accordance with the present invention.
Figure 2:
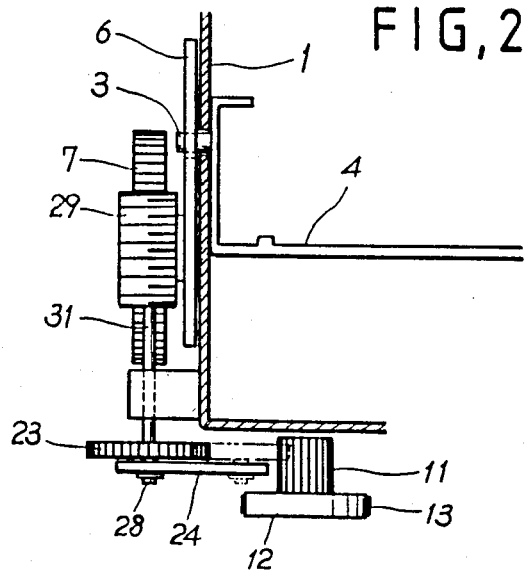
FIG. 2 is a cross-sectional view taken along the lines A—A in FIG. 1.

Referring to FIG. 1, a front loading device of a video cassette tape recorder in accordance with the present invention is schematically shown. The front loading device comprises a cassette holder 4 having a pin 3 outwardly protruded from one side wall of said cassette holder, which pin is inserted into a guide slot 2 formed at a housing bracket 1 of the body of recorder, thereby enabling said cassette holder 4 to be guided between ejecting and operating positions thereof. Disposed at the outside of the housing bracket 1 is a guide plate 6 having at one end thereof a slot into which the pin is inserted. The guide plate 6 is pivotably supported to the housing bracket 1. A gear 7 is supported to the pivot axis of the guide plate 6 to be freely rotated thereabout. The guide plate 6 is connected to the gear 7 by means of a spring 8 supported to the pivot asis of said guide plate. Accordingly, the guide plate 6 can pivot in clockwise or counter-clockwise depending upon the rotation of the gear 6, in order to move the cassette holder 4 along the guide slot 2 between ejecting and operating positions thereof. The gear 7 is driven by a loading motor 10 via a transmission mechanism of the present invention as will be described.

Figure 3:
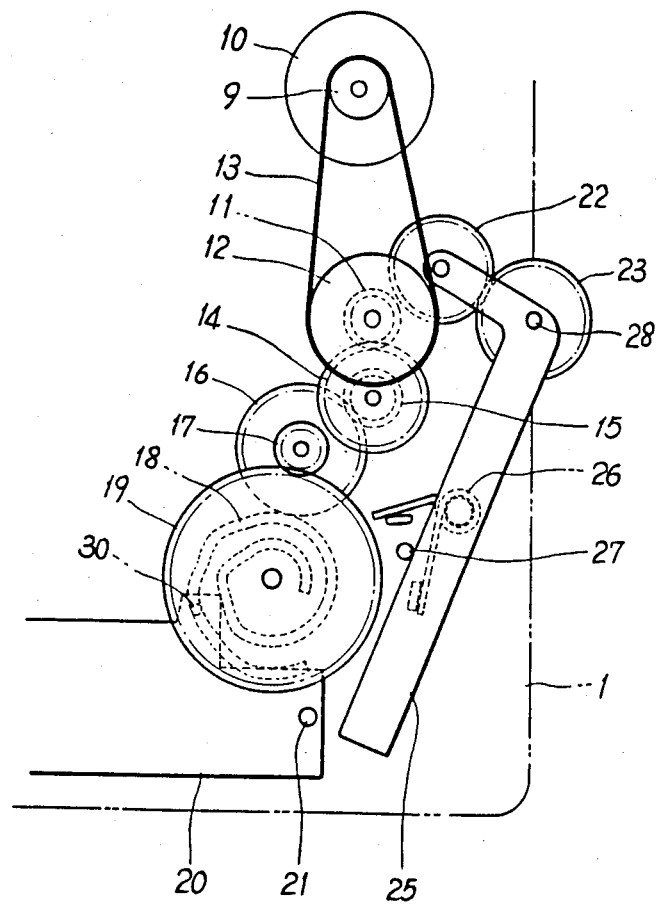
FIG. 3 is a bottom view taken in the direction indicated by an arrow B in FIG. 1, which shows a condition before a cassette tape is loaded in a recorder.
Figure 4:
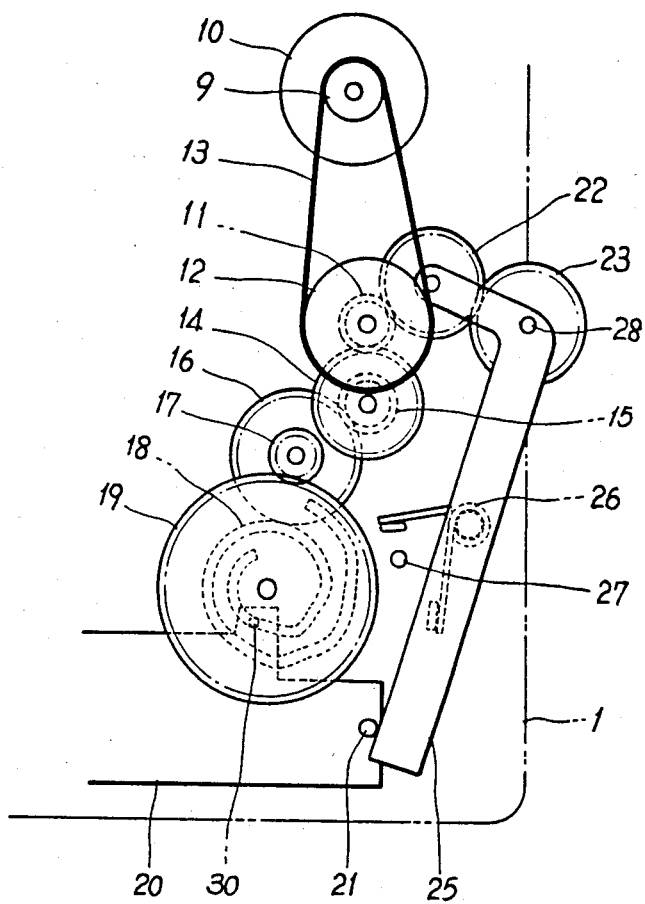
FIG. 4 is a bottom view similar to FIG. 3, which shows a condition when a cassette tape is loaded in a recorder.

The loading motor 10 is fixedly mounted to the bottom of the housing bracket 1. As shown in FIGS. 3 and 4, a pulley 9 is fixedly mounted to the shaft of the loading motor 10. The pulley 9 is connected to a pulley 12 having a large diameter than that of the pulley 9, via a belt 13. The pulley 12 is provided with a small diameter gear 11 which is engageable with a gear 22 of the transmission mechanism in accordance with the present invention, in order to drive the above-mentioned gear 7. The small gear 11 of the pulley 12 is always engaged with the first transmission gear 14 having a small diameter gear 15 which is always engaged with the second transmission gear 16. The second transmission gear 16 is provided with a small diameter gear 17 engaging with a cam gear 19 the cam gear 19 has a vortex cam slot 18 into which a pin 30 protruded from a connecting plate 20 is inserted. As the cam gear 19 rotates, the connecting plate 20 moves toward the left or right of FIG. 3 and functions to change the operating mode of the recorder as desired. The function and operation of the connecting plate 20 is well known, and so described no longer.

In accordance with the present invention, a transmission mechanism is provided for driving the gear 7 by the power of the loading motor 10, in order to move the cassette holder 4 between ejecting and operating positions thereof. The transmission mechanism comprises a lever 24 disposed below the bottom of the housing bracket 1 and pivotably mounted thereto by means of a shaft 28. Between the lever 24 and the bottom of housing bracket 1, a connecting gear 22 is mounted to the extension from the pivoted end of the lever 24, to be freely rotatable. The connecting gear 22 is selectively engagable with the small gear 11 of the pulley 12 connected to the loading motor 10, depending upon the pivot movement of the lever 24. With the connecting gear 22, a second connecting gear is always engaged, which is fixedly mounted to the shaft 28. The shaft 28 extended upwardly to have an extension 31. To the upper end of the extension 31, a worm gear 29 is fixedly mounted, which is always engaged with the gear 7. Thus, the gear 7 is selectively rotated via the first connecting gear 22, the second connecting gear 23, and the worm gear 29.

On the other hand, the lever 24 has the other end 25 extending to the position adjacent to the connecting plate 20, as shown in FIGS. 3 and 4 so that the end 25 of the lever 24 can be contacted with and pushed by the connecting plate 20 by means of a pin 24 protruded from the connecting plate 20, as said plate moves toward the left of FIG. 3. As being pushed by the connecting plate 20, the lever 24 pivots in counter-clockwise of FIG. 3, thereby causing the connecting gear 22 to engage with the gear 7. The lever 24 is always urged to pivot in clockwise of FIG. 3, by a spring 26 supported at one end thereof to the lever 24 and at the other end thereof to the housing bracket 1. Coils of the spring 26 is supported to the middle portion of the lever 24. A stopper 27 is protruded from the bottom of the housing bracket 1, in order to limit the clockwise pivot movement of the lever 24 urged by the spring 26.

In accordance with the present invention, the vortex cam slot 18 formed on the cam gear 19 has a slot portion with an unchanged radius so that the connecting plate 21 does not move during the loading and unloading operations of the front loading device. Accordingly, the lever maintains the condition where the connecting gear 22 engages with the small gear of the pulley 12 connected to the loading motor 10, during the loading and unloading operations of the front loading device, so that the gear 7 is received the drive force of the loading motor 10 in order to move the cassette holder 4 between ejecting and operating positions thereof. In the drawings, reference numeral 32 denotes a plate constituting the bottom of the housing bracket 1, 33 a bearing supporting the shaft 28 therein, and 34 a bushing for preventing the separation of the shaft 28 from the bottom of the housing bracket 1.

Now, operations of the front loading device of the present invention will be described in detail, by referring to FIGS. 3 and 4.

When a cassette tape is ejected from the recorder, the lever is in the condition urged in counter-clockwise against the spring force of the spring 26 by the connecting plate 20 which maintains its position fully moved left, as shown in FIG. 4. If a cassette tape is inserted into the cassette holder 4 and the loading operation of the front loading device is initiated from the above-mentioned condition, the loading motor drives to rotate the pulley 12 via the pulley 9 and the belt 13. As the pulley 12 rotates, the connecting gear 22 engaged with the small gear 11 of the pulley 12 rotates, so that the shaft 28 is rotated via the second connecting gear 23 engaged with said first connecting gear 22 and fixed to said shaft 28. As the shaft 28 rotates, the worm gear 29 fixed to the extension 31 of said shaft 28 rotates, thereby causing the gear 7 engaged with said worm gear 29 to rotate in clockwise. The clockwise rotation of the gear 7 causes the guide plate 6 to pivot in clockwise, so that the cassette holder 4 moves from the ejecting position to the operating position thereof by means of the pin guided the slot 5 of the guide plate 6 and the slot 2 of the housing bracket 1. During the loading operation of the front loading device, the lever 24 maintains the condition where the connecting gear 22 engages with the small gear 11 of the pulley 12, in view of the fact that the pin 30 of the connecting plate 20 is guided along the radius-unchanged slot portion of the vortex cam slot 18 of the cam gear 19 which continuously rotates by the driving force of the loading motor via the small gear 11 of the pulley 12 and transmission gears 14 and 16.

When the cassette tape is loaded on the reel table of the recorder, the loading operation of the front loading device is completed and the pin 30 of the connecting plate 20 is introduced into and guided along the radius-changed portion of the vortex cam slot 18 of the rotating cam gear 19. Since the cam gear 19 rotates in a direction that the radius of the slot 18 is gradually increased, the connecting plate 20 moves toward the left of FIG. 4, thereby causing the lever 24 to pivot in clockwise by the spring force of the spring 26. Accordingly, the connecting gear 22 is disengaged from the small gear 11 of the pulley 12 as shown in FIG. 3, so that the driving force of the loading motor 10 is not transmitted to the front loading device no longer. The connecting plate 20 continuously moves toward the left of FIG. 3 by the driving of the loading motor 10, until it reach the position corresponding to the stop mode of the recorder at which the loading motor 10 is stopped.

As well-known, the loading motor 10 again drives according to the operating mode change from the stop mode, thereby causing the connecting plate 20 to move toward the left of FIG. 3 in order to carry out the operation required to each selected operating mode.

When the cassette tape is ejected from the recorder at the stop mode thereof, the loading motor 10 rotates in the reverse direction to that in the loading operation of the front loading device. Accordingly, the connecting plate 2 moves the right of FIG. 3, as the pin 30 of the connecting plate 2 is guided the vortex cam slot 18 of the cam gear 19 which rotates in the direction that the radius of the slot is gradually decreased. As the connecting plate 20 continuously moves to the right of FIG. 3, the pin 21 of the connecting plate 20 contacts to and pushes the end 25 of the lever 24, so that the lever 24 is urged to pivot in counterclockwise against the spring force of the spring 26, thereby causing the gear 22 to engage with the gear 11 of the pulley 12. Thereby, the driving force of the loading motor is transmitted to the gear 7, in the same manner as in the loading operation. At this time, the pin 30 of the connecting plate 20 is introduced into and guided along the radius-unchanged unchanged slot portion of the slot 18. Accordingly, the connecting plate 20 does not move and the lever 24 maintains the condition where the connecting gear 22 engages with the small gear 11 of the pulley 12. This condition is continued until the unloading operation of the front loading device is completed. Since the loading motor 10 rotates in the reverse direction to that in the loading operation, the gear 7 is rotated in counterclockwise of FIG. 1, so that the cassette holder 4 can moves from the operating position to the ejecting position.

As apparent from the above description, the present invention enables, with a simple construction, that the existing loading motor is utilized as a power source for driving the front loading device.

While the present invention has been described with reference to a preferred embodiment, it will be understood by those skilled in the art that various changes may be made without departing from the scope of the invention.

What is claimed is:

1. A front loading device in a video cassette tape recorder comprising a cassette holder having a pin outwardly protruded from one side wall of said cassette holder and inserted into a guide slot formed in a housing bracket of said the body of recorder, thereby enabling said cassette holder to be guided between ejecting and operating positions thereof; a gear mounted adjacent one side of said housing and being freely rotatable and adaped to move said cassette holder by the rotation thereof; and a loading motor fixedly mounted to the bottom of said housing bracket and adapted to provide a driving force for rotating a cam gear with a vortex cam slot in order to operate a connecting plate for changing the operating mode of the recorder, which connecting plate is operatively connected to said cam gear by means of a pin protruded from said connecting plate and guided along said vortex cam slot of cam gear, said loading motor connected to said cam gear by means of a belt-pulley device and transmission gears, said device being characterized by further comprising a mechanism for transmitting the drive force of said loading motor to said gear for moving the cassette holder during the loading and unloading operations thereof, comprising:

a lever pivotably mounted at one end thereof to the bottom of said housing bracket by means of a shaft mounted to be freely rotatable and extended upwardly therefrom, the other end of said lever extending to the position where said connecting plate can contact with said other end of said lever;

a first connecting gear mounted to an extension from one end of lever to be freely rotatable and selectively connected with said belt-pulley device on the pivoted position of said lever, so as to selectively receive the driving force of said loading motor;

a second connecting gear fixedly mounted to said shaft functioning as the pivot axis of said lever and engaged with said first connecting gear;

a worm gear fixedly mounted to the upper end of said shaft and engaged with said gear for moving the cassette holder;

a spring supported at one end thereof to said lever and at the other end thereof to the bottom of said housing bracket and adapted to urge the lever in a direction that said first connecting gear engages with said belt-pulley device to receive the driving force of said loading motor; and said vortex cam slot having a slot portion adapted to cause said connecting plate to push said other end of said lever such that said lever pivots in a direction that said first connecting gear engages with said belt-pulley device to receive the driving force of said loading motor and adapted to maintain the engagement between said first connecting gear and said belt-pulley device during the loading and unloading operations of the front loading device.

* * * * *

UNITED STATES PATENT AND TRADEMARK OFFICE
CERTIFICATE OF CORRECTION

PATENT NO. : 4,723,177
DATED : February 2, 1988
INVENTOR(S) : Ki H. Ahn It is certified that error appears in the above-identified patent and that said Letters Patent is hereby corrected as shown below:

On the title page assignee should read

-- Gold Star Co., Ltd. --.

Signed and Sealed this

Twenty-third Day of October, 1990

Attest:

HARRY F. MANBECK, JR.

*Attesting Officer*  *Commissioner of Patents and Trademarks*